(12) United States Patent
Smith et al.

(10) Patent No.: US 12,346,468 B1
(45) Date of Patent: Jul. 1, 2025

(54) SYSTEMS AND METHODS FOR CONTROLLING USER ACCESS TO DATA VIA USER ACTIVITY MODELS

(71) Applicant: United Services Automobile Association (USAA), San Antonio, TX (US)

(72) Inventors: Arthur Quentin Smith, Fredericksburg, TX (US); Justin Dax Haslam, San Antonio, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 306 days.

(21) Appl. No.: 17/546,903

(22) Filed: Dec. 9, 2021

Related U.S. Application Data (60) Provisional application No. 63/125,737, filed on Dec. 15, 2020.

(51) Int. Cl.
   *G06F 21/00* (2013.01)
   *G06F 21/62* (2013.01)
   *G06N 5/022* (2023.01)

(52) U.S. Cl.
   CPC ......... *G06F 21/6218* (2013.01); *G06N 5/022* (2013.01)

(58) Field of Classification Search
   CPC .... G06F 21/6218; G06F 21/50; G06F 21/554; G06N 5/022; H04L 63/108
   See application file for complete search history.

(56) References Cited

U.S. PATENT DOCUMENTS

| | | | | |
|---|---|---|---|---|
| 10,063,434 | B1* | 8/2018 | Khanal | H04L 43/20 |
| 11,615,170 | B1* | 3/2023 | Guerra | G06F 21/62 |
| | | | | 726/28 |
| 2009/0125632 | A1* | 5/2009 | Purpura | H04L 63/10 |
| | | | | 709/229 |
| 2015/0310188 | A1* | 10/2015 | Ford | H04L 63/101 |
| | | | | 726/28 |
| 2020/0162503 | A1* | 5/2020 | Shurtleff | G06F 9/451 |

\* cited by examiner

*Primary Examiner* — Joseph P Hirl
*Assistant Examiner* — Chi D Nguy
(74) *Attorney, Agent, or Firm* — Fletcher Yoder, P.C.

(57) ABSTRACT

A method may include receiving, via a processor, a request to access data stored in a storage component and determining an identity of a user requesting access to the data based on user device data. The method may also involve monitoring one or more activities performed by the user on the data, determining whether the one or more activities correspond to one or more expected activities for the user accessing the data based on a model, and modifying the one or more access rights of the user to the data in response to determining that the one or more activities do not correspond to the one or more expected activities.

20 Claims, 4 Drawing Sheets

SYSTEMS AND METHODS FOR CONTROLLING USER ACCESS TO DATA VIA USER ACTIVITY MODELS

CROSS-REFERENCE TO RELATED APPLICATION

The present application claims benefit of and priority to U.S. Provisional Patent Application Ser. No. 63/125,737, titled "Systems and Methods for Controlling User Access to Data via User Activity Models," which was filed on Dec. 15, 2020, and which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Improvements in secure, confidential access to data are increasingly important in light of an exponential growth of cybersecurity technology. With ever-growing cybersecurity threats, users that work with highly confidential data should use a robust system that is capable of both deterring and preventing unauthorized users from accessing confidential data. Unfortunately, it may be difficult to detect unauthorized access if, for example, an unauthorized user gains access to the confidential data through unauthorized means. As such, improvements in cybersecurity protection are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via a processor, a request to access data stored in a storage component and determining an identity of a user requesting access to the data based on user device data. The method may also involve monitoring one or more activities performed by the user on the data, determining whether the one or more activities correspond to one or more expected activities for the user accessing the data based on a model, and modifying the one or more access rights of the user to the data in response to determining that the one or more activities do not correspond to the one or more expected activities.

In another embodiment, a non-transitory computer readable medium may include computer-executable instructions that, when executed by at least one processor, may cause the at least one processor to perform operations that may include receiving a request to access data stored in a storage component, determining an identity of a user requesting access to the data based on user device data, and monitoring one or more activities performed by the user on the data. The operations may then include determining whether the one or more activities correspond to one or more expected activities for the user accessing the data based on a model, such that the model is associated with the identity. The operations may also include modifying one or more access rights of the user to the data in response to determining that the one or more activities do not correspond to the one or more expected activities.

A system may include a computing device and a server system comprising a storage component. The server system may receive a request to access data stored in the storage component from the computing device, determine an identity of a user requesting access to the data based on user device data, and monitor one or more activities performed by the user on the data. The server system may then determine whether the one or more activities correspond to one or more expected activities for the user accessing the data based on a model, such that the model is associated with the identity. The server system may then modify one or more access rights of the user to the data in response to determining that the one or more activities do not correspond to the one or more expected activities.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Present embodiments of the disclosure relate to systems and methods for controlling user access to a certain type of data (e.g., confidential data). This is beneficial to users, such as high level government officials, that work with highly confidential data that wish to prevent and discourage unauthorized users from accessing the confidential data. Such systems and methods may include, but are not limited to, using a decryption key to provide user access to data, controlling a time frame that a user may access data, enforcing controls based on user activity (i.e., max accesses in a timeframe, max accesses per user, max accesses per device, max accesses from a certain geographic area, max accesses from a "public" area, etc.), and the like.

To identify unauthorized access and ensure that only authorized users are accessing the confidential data, present embodiments described herein may utilize a data access system to determine or identify if user activity is authorized or unauthorized. That is, the data access system may use machine learning algorithms or other identifying techniques to determine or identify whether a user's activity is consistent with "normal" user activity. For example, the data access system can monitor and log factors such as, but not limited to, an amount of data accessed, a period of time (e.g., during day, hour block) the data is accessed, a type of user action being performed with the data (e.g., capturing data, changing data, or deleting data), a location of the user during the access attempt, and the like. These factors may be utilized in conjunction with the identifying techniques to compare and contrast the current user activity with respect to a previously generated model of user activity associated with the user and other users with similar responsibilities or authority.

Figure 1:
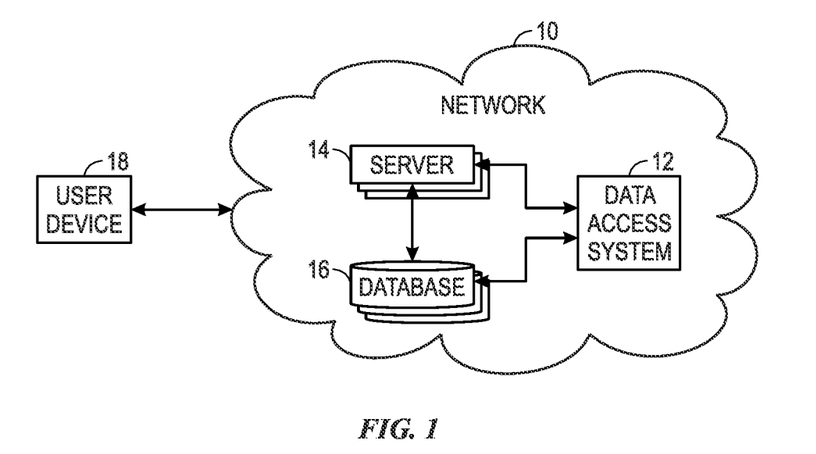
FIG. 1 illustrates a block diagram of a system for transmitting and controlling data via a data access system, in accordance with embodiments described herein.

By way of introduction, FIG. 1 illustrates a block diagram of a system for transmitting, receiving, and controlling data access by various computing systems using a data access system 12. The data access system 12 may include a network 10 that communicates with server devices 14, databases 16, and the like. The data access system 12 may communicate with other devices using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The network 10 may be a network operated by an organization (e.g., a bank, an insurance company, or a financial group). In some embodiments, the network 10 may be a private network, such as local area network (LAN) that includes a variety of computing and networking devices including, but not limited to, switches, servers (e.g., processors), storage (e.g., memory) and routers. Accessing the network 10 may be limited based on restrictions and access rules established to relegate access to selected users (i.e., clients, employees, third party service providers, regulatory representatives, etc.). The organization may use the network 10 to provide a variety of services for the clients.

In one embodiment, an organization (e.g., a bank) may use the server devices 14 to provide data services (e.g. storage, backup, or data analysis) for users that access a certain type of data (e.g., confidential data, data provided by government officials). In some embodiments, such services may be provided as service applications (i.e., web browser applications, mobile applications, containers, Software as a Service (SaaS), etc.), which may be accessible to one of more user devices 18. The data storage may be hosted and managed on service devices 14, which may include one or more computing systems and one or more storage components (e.g., database, memory, storage). The server devices 14 may provide support for running data storage related applications.

In some embodiments, the data access system 12 may monitor user activity that involves accessing the server device 14 and/or the database 16 via the user device 18 to detect whether the accesses are unauthorized. For example, the data access system 12 may use user activity models to verify whether the current user activity (e.g., data access attempts) corresponds to expected or normal behavior. For example, the data access system 12 may check if a location, a device type, a time of access, or other properties associated with the user device 18 correspond to expected properties for the user device 18. The expected behavior may be captured in the corresponding user activity model. Likewise, the data access system 12 may determine whether data accessed via the user device 18 that is modified, added, deleted, captured, viewed or the like corresponds to expected actions as per the corresponding user activity model.

In response to detecting an unexpected type of data access (e.g. accessing data past an allocated time), the data access system 12 may limit access to the corresponding data. For example, the data access system 12 may modify access rights for the user to access the data (e.g., revoke access rights for the user for the session). Additionally, the data access system 12 may communicate via the network 10 to the user device 18 that the data access rights have been modified for the user for the session.

As illustrated in FIG. 1, a user may access one or more data storage services provided by the organization using one or more user devices 18. The user devices 18 may include a variety of suitable devices, including but not limited to a desktop computer, a smartphone, a laptop, a tablet, or any other suitable computing device. In some embodiments, a computing device uniquely configured to access the network 10 may be used to perform the techniques described herein, as opposed to common devices available to the public The user devices 18 may have access to the network 10 directly (e.g., through a specific virtual private network (VPN) connection) or indirectly (e.g., via a public network and with certain security protocols). During an access to a service provided by the organization via the network 10, data (such as name, address, phone number, email address, age, and social security number) associated with the user of the user device 18 may be utilized (i.e., recorded, verified, processed, analyzed, modified, and modeled) by the organization using one or more service devices 14.

The databases 16 may be any suitable storage component that stores data for processing by the server devices 14 or the like. Such data may include a subset of data that may be categorized as having a higher priority or may be stored in the databases 16. The database may also store decryption tools to decrypt decryption keys provided from the user. In some embodiments, the databases 16 may store instructions for the server device 14 or the data access system 12 for data processes (e.g. analyzing user activity logs). With this in mind, the data access system 12 may query the databases 16 to determine whether data has been modified, added, or deleted by a user.

Figure 2:
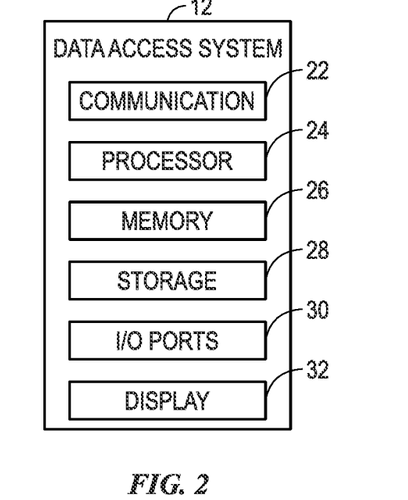
FIG. 2 illustrates a block diagram of the data access system of FIG. 1, in accordance with embodiments described herein.

To perform the methods described herein, the data access system 12 may use certain components as illustrated in FIG. 2. For example, the data access system 12 may include a communication component 22, a processor 24, a memory 26, a storage 28, input/output (I/O) ports 30, a display 32, and the like. The communication component 22 may facilitate communication between the data access system, the server device 14, the databases 16, the user device 18, and any other suitable communication-enabled devices. That is, the communication component 22 may facilitate data communication to the data access system 12, such that the data access system 12 may receive data from the other devices depicted in FIG. 1.

The processor 24 may be any type of computer processor or microprocessor capable of executing computer-executable code. The processor 24 may also include multiple processors that may perform the operations described below. The memory 26 and the storage 28 may be any suitable articles of manufacture that can serve as media to store processor-executable code, data, or the like. These articles of manufacture may represent computer-readable media (e.g., any suitable form of memory or storage) that may store the processor-executable code used by the processor 24 to perform the presently disclosed techniques. The memory 26 and the storage 28 may store data, various other software applications for analyzing the data, and the like. The memory 26 and the storage 28 may represent non-transitory computer-readable media (e.g., any suitable form of memory or storage) that may store the processor-executable code used by the processor 24 to perform various techniques described herein. It should be noted that non-transitory merely indicates that the media is tangible and not a signal.

The I/O ports 30 may be interfaces that may couple to other peripheral components such as input devices (e.g., keyboard, mouse), sensors, input/output (I/O) modules, and the like. The display 32 may operate to depict visualizations associated with software or executable code being processed by the processor 24. In an embodiment, the display 32 may be a touch display capable of receiving inputs from a user of the data access system 12. The display 32 may be any suitable type of display, such as a liquid crystal display (LCD), plasma display, holographic, or an organic light emitting diode (OLED) display, for example. Additionally, in an embodiment, the display 32 may be provided in conjunction with a touch-sensitive mechanism (e.g., a touch screen) that may function as part of a control interface for the data access system 12.

It should be noted that the components described above with regard to the data access system 12 are exemplary components and the data access system 12 may include additional or fewer components as shown. Moreover, the components described above in FIG. 2 may also be part of the server devices 14 or the user device 18 of FIG. 1.

Keeping the foregoing in mind, the data access system 12 may track access attempts to the server device 14, the database 16, of multiple users over time. Using the access attempt data for multiple users, the data access system 12 may generate a model of expected data access behavior for different users, groups of users, types of users, or the like. If the data access system 12 determines the user's activity does not match expected behavior, the data access system 12 may modify the access rights for the user device associated with the unexpected user activity. In this way, the data access system 12 may dynamically modify the access rights of user device 18 to reduce likelihood of unauthorized access of components in the network 10. Moreover, by monitoring the activities of multiple users to create the access model, the data access system 12 may more efficiently identify unauthorized data access attempts by comparing access attempts to a collection of behavior characteristics, as opposed to systematically reviewing each behavior characteristic individually. That is, the holistic evaluation of the collection of access behavior attributes in light of the model of access behavior may enable the data access system 12 to use less memory and processor resources and process the likelihood of whether the access attempt is unauthorized more efficiently.

Figure 3:
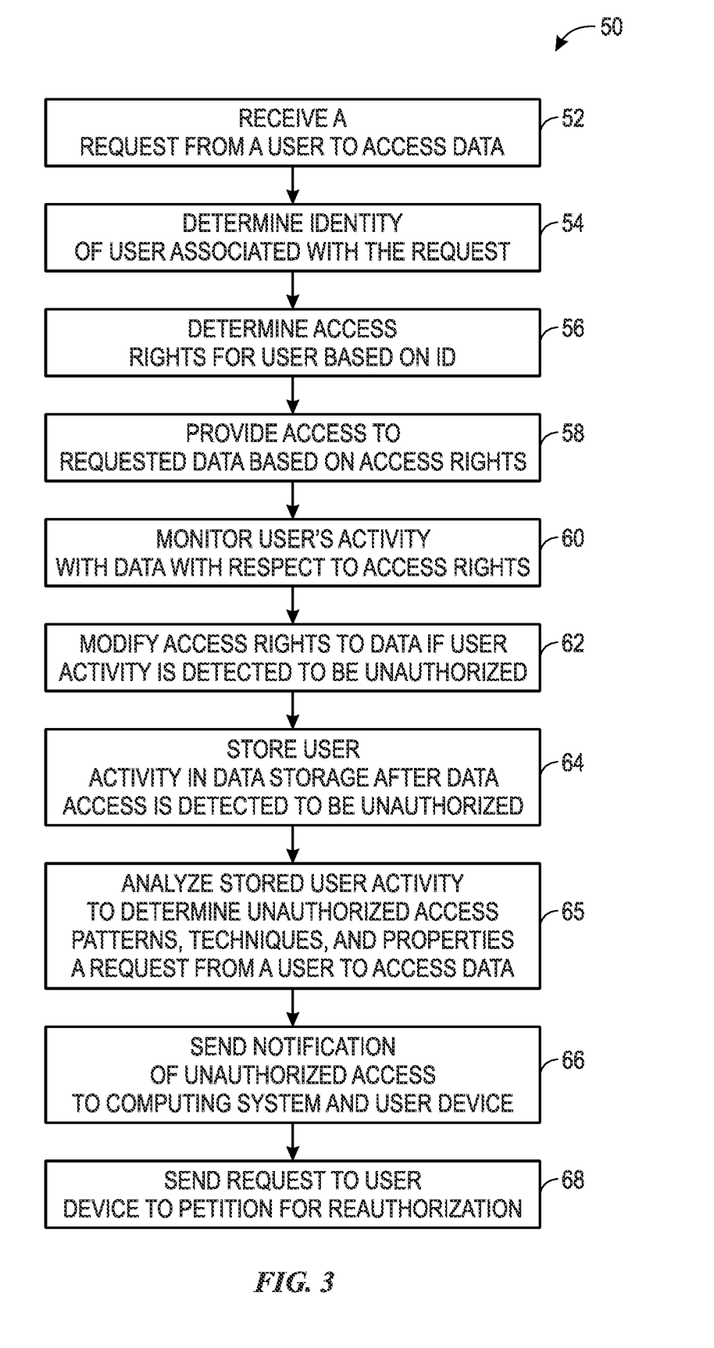
FIG. 3 illustrates a flow diagram of a method for controlling user access rights to access data, in accordance with embodiments described herein.

By way of example, FIG. 3 illustrates a flow diagram of a method for providing and modifying access rights to data corresponding to a user of the user device 18 based on the user's activity. Although the method described in FIG. 3 is described in a particular order and as being performed by the data access system 12, it should be understood that the method may be performed in any suitable order (e.g., in parallel) and by any suitable computing device or application.

Referring now to FIG. 3, the data access system 12 may receive a request to access data (block 52) from one or more user devices 18 or some other computing device. Facilitating the request may involve the user device 18 providing one or more forms of authentication such as, but not limited to, a decryption key, a password, a personal identification number (PIN), biometric authentication, a username, or the like. As such, the request received from the user device 18 may include authentication data for the user. In some embodiments, the authentication data may include mannerisms or behavior patterns of the user that may be acquired via image sensors, motion sensors, location sensors, or any other suitable tracking sensor device. The tracked data may be used to compare the user's behavior to a model of the user to authenticate the user.

In response to receiving the request for data, the server device 14 may query the database 16 or other suitable storage component to retrieve the requested data. In some embodiments, the database 16 may store data for each user in a format that includes an identification parameter associated with the identity of the respective client. The identification parameter may be used by the data access system 12 to track the usage of the user's data. That is, the database 16 may associate every piece of data it stores or collects in regards to tracking the usage of the user's data with the respective identification parameter of the user. Thus, each distinct piece of data may also be stored in the database 16 with a corresponding identification parameter to keep track of each individual user's data.

After receiving the authentication data for the user of the user device 18, the data access system 12 may query the database 16 or other suitable storage component to determine the identity of the user associated with the request (block 54). For example, the data stored on the database 16 may include a header portion that specifies the identification parameter or client associated with the respective data. The authentication data may be used to determine an appropriate identification parameter for the user, such that the identification parameter may be used to query the database 16. In some embodiments, the data stored in the database 16 may be organized or structured according to the identification parameter to facilitate more efficient querying operations.

After determining the identity of the user associated with the requested data, the data access system 12 may determine access rights for the user based on the determined identification (block 56). In one embodiment, the data access system 12 may determine access rights based on factors such as, but not limited to, the determined user identification, the time of day, a current date, a set schedule, a number of requests for data by the user in a set time period, and the like. Additionally, the data access system 12 may retrieve data parameters such as, but not limited to, location data and type of user device from the user device 18. Moreover, the data access system 12 may data access rights to account for a risk tolerance (e.g., favoring false negatives or favoring false positives) as set by an administrator or an organization of the data access system 12. With the data parameters, the data access system 12 may determine access rights for the user. The access rights may correspond to one or more conditions in which the user or the user device 18 is allowed to access a particular set of data. For example, the user device 18 may be set to be accessible either only indoors or only outdoors. In one embodiment, the user device 18 may be configured to only allow user access if there is no detected motion, sound, or image of persons that are not the user in a given proximity. As such, the access rights may be related to associations between one or more access parameters and a corresponding set of data. The access parameters may correspond to one or more parameters of the access rights that may enable the user device 18 to access the respective data. By way of example, the access parameters may include an amount of time in which the user may access the data, a duration of time in which the user may access the data, a time period in which the user may access the data, and the like. The access rights of the user may be stored in the database 16 or any suitable storage component.

If the user is authorized to view the data, the data access system 12 may provide access to the requested data based on the determined access rights (block 58). As such, the data access system 12 may identify locations of the requested data from the database 16 or other suitable storage component and send the location data to the user device 18. In this way, the data access system 12 may control access to the locations of the requested data while the user device 18 is authorized to access the respective data.

While the user is accessing the data, the data access system 12 may monitor user activity with the retrieved data in respect to access rights (block 60). Such user activity may include, but is not limited to, an amount and a type of data that is modified, added, deleted, captured, viewed, or accessed by the user. Moreover, the data access system 12 may monitor if user activity exceeds certain bounds of authorized activity as set earlier by the data access system 12 or through other means (e.g., manually set by an administrator). For example, the data access system 12 may monitor if the user device 18 is accessing data past the allocated time period, if the user has exceeded the allocated amount of requests for data, if the user device 18 that is attempting to access data is not authorized to view the respective data, and the like.

After detecting unauthorized user activity, the data access system 12 may modify user access rights to the data (block 62). Such modifications may include, but are not limited to, decreasing the allocated time period for accessing data, disassociating the identification data from being used to access the data, limiting a type of data that may be accessed during the allocated time period, immediately ending any access to the data, and the like. In one embodiment, the data access system 12 may send pseudo data to the user device 18 in lieu of the requested data to avoid the unauthorized user from determining that his/her unauthorized access has been detected. Additionally, as shown in block 64, the unauthorized user activity may be stored by the data access system 12 in the database 16. The stored data may be stored with an identification parameter associated with the user. In some embodiments, the data access system 12 may use the stored data to aid in generating a model for authorized user activity. In accordance with the described scenario, the data access system 12 may communicate via the network 10 to a suitable computing device or the like associated with, for example, the owner of the system that unauthorized access has been detected. Moreover, the data access system 12 may communicate via the network 10 to the user device 18 that its activity has been determined to be unauthorized.

Following storing the unauthorized user activity, the data access system 12 may then analyze the stored unauthorized user activity to determine unauthorized access patterns, techniques, and properties (block 65). For example, the data access system 12 may identify one or more factors related to the unauthorized user activity with the data, such as the amount and type of data that is modified, added, deleted, captured, viewed, or accessed by the unauthorized user. Additionally, the data access system 12 may identify other factors associated with the unauthorized activity, such as the time of day accessed, the location, the associated user device 18, and the like. In some embodiments, the data access system 12 may use these factors to incorporate in generating a model for unauthorized user activity to aid in detecting further unauthorized activity.

In some embodiments, at block 66, the data access system 12 may send a notification indicative of the unauthorized access to the user device 18. The notification may cause the user device 18 to automatically open or execute an application regardless of whether the application was active (e.g., currently being executed) or inactive (e.g., in a sleep mode, not initiated). The notification may be presented via the user device 18 as a visualization, an audible alert, a haptic alert, or the like. In this way, the user of the user device 18 may become aware of the unauthorized access.

After modifying access rights, the data access system 12 may send a request to the user device 18 to petition for reauthorization (block 68). The data access system 12 may request the user to provide an authentication parameter such as, but not limited to, a decryption key, a password, a personal identification number (PIN), biometric authentication, a username, or the like. In some embodiments, the authentication may be different in regards to the first form of authentication provided by the user. For example, if the user provided a password A at first, the data access system 12 may only grant access rights upon receiving a password B associated with the user or receiving a different method of authentication (e.g. a PIN in lieu of a password). Alternatively, the second form of authentication may be of a different type of authentication, as compared to the first authentication form. In one embodiment, the data access system 12 may reauthorize access rights based on user confirmation without additional identification. For example, upon expiration of the allocated time period, the data access system 12 may display onto the user device 18 an interactive visualization onto the user device 18 to extend the allocated time period. In some embodiments, the reauthorization request or extension of time may be provided in response to the user's behavior while accessing the requested data being congruent with expected behavior according to a data access model. Upon receiving reauthorization, the data access system 12 may provide the user with data access rights in accordance with previously granted access rights. In certain embodiments, the data access system 12 may instead provide modified access rights (e.g. decreased allocated time period for accessing data). In another embodiment, the data access system 12 may require another person besides the user to provide authentication data in addition to the user providing authentication data.

As discussed above, the data access system 12 may collect data regarding multiple users accessing different types of data via the network 10 in accordance with the method 50 described above. Using the collected data, the data access system 12 may generate an access model that may characterize expected authorized behavior and expected unauthorized behavior for accessing various types of data. The data access system 12 may then track user activity data of various user devices 18 with respect to the data access model to assess whether the user's activity corresponds to expected user behavior for access, authentication, re-authentication, and the like.

Figure 4:
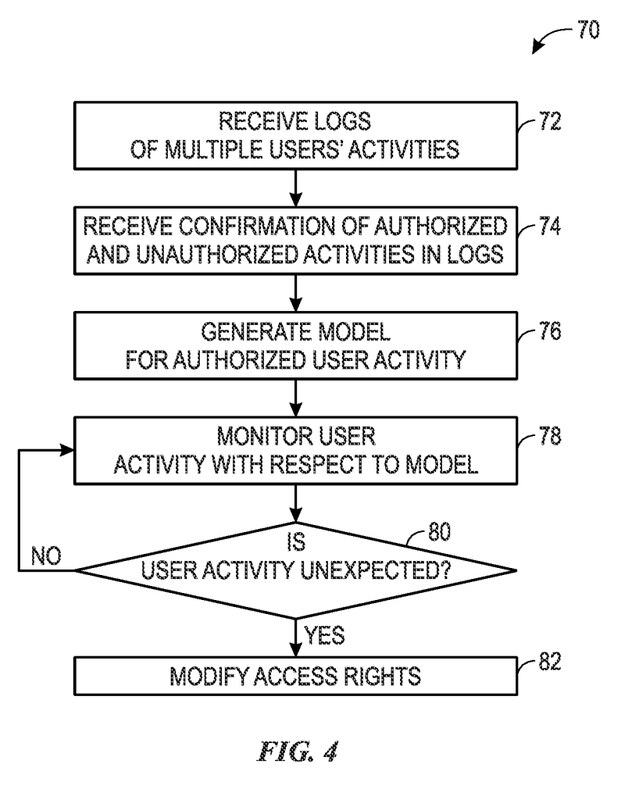
FIG. 4 illustrates a flow diagram of a method for detecting authorized and unauthorized user activity, in accordance with embodiments described herein.

With this in mind, FIG. 4 illustrates a method 70 that the data access system 12 or other suitable computing device may implement to control access a model detailing a user's activity for detecting authorized and/or unauthorized user activity. Although the method 70 is described as being performed by the data access system 12, it should be noted that any suitable computing system may perform the method 70. Moreover, although the method 70 is described in a particular order, it should be noted that the method 70 may be performed in any suitable order.

Referring now to FIG. 4, at block 72, the data access system 12 may receive logs of multiple users' activities. These logs may be retrieved from the database 16 or any other suitable storage device. The logs may detail the amount of data accessed, the time of day the data is accessed, the type of user action with the data (e.g. capturing data, changing data, deleting data), the location of the user and the like. That is, the logs may include access information related to the data collected while performing the method 50 describes above. The logs may then be utilized by the data access system 12 to predict and confirm either authorized or unauthorized user activity (block 74).

In certain embodiments, the data access system 12 may have instructions stored in its memory 26 for analyzing user activity logs to classify each activity log as being related to authorized or unauthorized activity. In some embodiments, the logs can be manually reviewed by an individual or entity via the data access system 12 to classify the log as being authorized and/or unauthorized activities. In some embodiments, the data access system 12 may classify user activity logs as authorized or unauthorized based on the activity being within or out of bounds of the access rights associated with the user device 18, as described above with reference to the method 50. The data access system 12 may store its analysis in the database 16 or any other suitable storage component.

After analyzing and confirming authorized and/or unauthorized activity, the data access system 12 may generate a model for authorized user activity (block 76) for one or more users. In some embodiments, the model may be trained over a period of time using a machine learning algorithm that receives logs of user activity. That is, the data access system 12 may log the user's location, time periods in which the user is accessing data, an amount of data the user is accessing, types of data the user is accessing, the user's actions with the data (e.g. capturing data, changing data, deleting data), and the like. In some embodiments, the data access system 12 may send a notification regarding the new activity to the machine learning algorithm, which may modify the model to capture the new activity and incorporate it into the user activity model. As a result, the model may effectively assist the data access system 12 in generating a user activity model that takes into account the user's most recent activities. As more sessions are completed by users, the accumulation of user activity logs may be incorporated into the model as training data for the machine learning algorithm. The machine learning algorithm may then continuously improve a confidence level for identifying what activity should be associated with a user.

In some embodiments, the model for authorized activity may be continuously updated based on a pattern of detected behavior by multiple users with regard to multiple behavior properties. For example, the users' activities performed with respect to the data access rights, as described in block 60 of the method 50, may be monitored for multiple users to establish a baseline expected pattern of behavior. In some cases, the modification of access rights may be deemed as expected behavior if more than a threshold amount of users received the same modification based on the same user activity behavior. For instance, multiple users may repeatedly exceed the allotted time period for access to perform tasks, and the data access system 12 may routinely modify the access rights of the same users to provide a certain extension of time (e.g., 5 minutes) of the time period. Although the behavior property for receiving the extension of time corresponds to an unauthorized activity, the data access system 12 may determine that the unauthorized activity corresponds to expected behavior and the model may reflect this pattern.

After generating the model, the data access system 12 may monitor user activity in respect with the generated model (block 78). The data access system 12 may monitor user activities, such as the amount of data accessed, the time of day the data is accessed, the type of user action with the data (e.g. capturing data, changing data, deleting data), the location of the user, and the like. While monitoring, the data access system 12 may compare the recorded activities with the generated model to detect unexpected activity with respect to the assortment of data points that correspond to the users' activities (e.g., amount of data accessed, the time of day the data is accessed, the type of user action with the data, the location of the user). That is, in some embodiments, the data access system 12 may detect a condition in which a user is accessing data from a new location, from a new device, at a time that differs from an expected time, and the like. In addition, the data access system 12 may determine whether the user is accessing an amount of data that differs from an expected amount of data, accessing types of data that differs from expected types of data, performing actions with the data that differ from expected actions (e.g. capturing data, changing data, deleting data), and the like.

At block 80, the data access system 12 may determine whether the monitored user activity is unexpected based on comparison with the generated model. This determination may be made based on a set tolerance or threshold difference between the present user activity and the generated model. For example, a user may normally access data in between hour A to hour B, and the system may flag unexpected activity if there is user activity at a time that is X hours before hour A or X hours after hour B. In some embodiments, this tolerance may be set by a machine learning algorithm that detects a pattern in which the user performs a particular activity, which may be represented in the model.

In certain other embodiments, the tolerance may be manually set by the owner of the system via stored instructions in the storage components of the data access system 12, the database 16, or any other suitable storage device. In some embodiments, if the user activity is indeed within the tolerances with regard to the generated model, then the system shall continue monitoring the user activity until the user ends the session or an unexpected activity is detected.

Upon detection of unexpected activity, the data access system 12 may modify access rights for the user (block 82). Such modifications may include, but are not limited to, decreasing the allocated time period for accessing data, deactivating the identification used to access the data, limiting what data may be accessed during the allocated time period, immediately ending any access to the data, and the like. The data access system 12 may send a notification to the user that his or her access rights have been modified, and a similar notification may be sent to the owner of the system that the user who had his or her access rights modified used. In some embodiments, the data access system 12 may display onto the user device 18 an interactive visualization to provide re-authentication, which may include, but is not limited to, a decryption key, a password, a personal identification number (PIN), biometric authentication, a username, or the like to maintain access to the data. Further, the data access system 12 may display filler data to the user device 18 in lieu of requested data.

Figure 5:
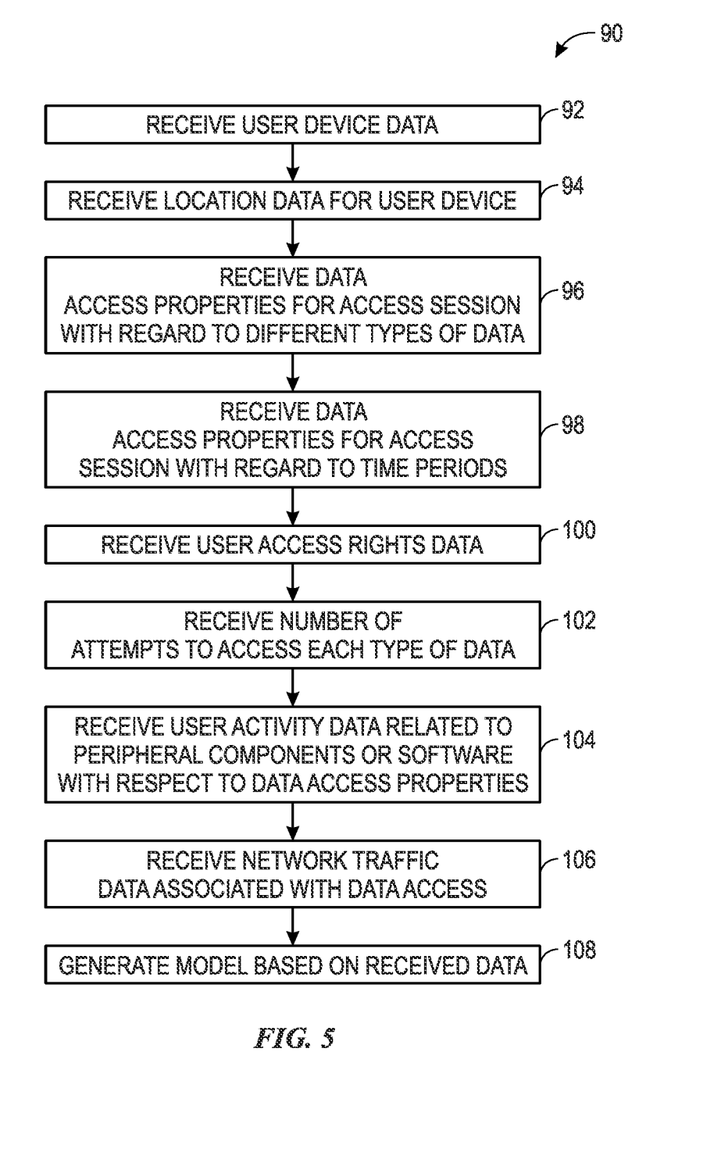
FIG. 5 illustrates a flow diagram of a method for generating a model based on received data, in accordance with embodiments described herein.

As discussed above, the data access system 12 may receive logs of multiple user activity from the database 16 in accordance with the method 70 detailed above. The data access system 12 may utilize the comprehensive user activity data to generate a user activity model to modify user access rights. The generated model may take into account several factors from the retrieved data as detailed in method 90. The data access system 12 may use the generated model to compare the recorded activities with the model to detect unexpected activity with various set thresholds, as will be discussed below.

By way of example, FIG. 5 illustrates a flow diagram of a method 90 for dynamically generating a holistic model based on received user activity data. Although the method 90 described in FIG. 5 is described in a particular order and as being performed by the data access system 12, it should be understood that the method 90 may be performed in any suitable order and by any suitable computing device or application. It should be mentioned that the data used throughout this application and steps described above may be implemented as conditional steps based on perceived security, threat, or risk level.

Referring now to FIG. 5, at block 92, the data access system 12 may receive data pertaining to the user's device 18. In some embodiments, the data access system 12 may identify a platform that the user device 18 is using. Such platforms may be a phone, a desktop computer, a laptop, a kiosk, or any other suitable device. Similarly, the data access system 12 may also identify the operating system of the user device 18 associated with the identified platform. Such operating systems may include iOS®, Android OS®, Windows®, Linux, macOS®, and the like. Additionally, the data access system 12 may identify a version the operating system that the user device 18 is using. In the same thread, the data access system 12 may gather network information about the user device 18, such as a public IP, a hostname, and the like. In addition, the data access system 12 may retrieve physical aspects of the user device 18, such as, for example, a screen resolution in which data is displayed or other properties that may be detectable by the data access system 12.

At block 94, the data access system 12 may receive the location data of the user device 18. The data access system 12 may receive the location via GPS services, determine the location via the public IP address, or via another suitable method. Specifics of the location that are retrieved by the user device 18 may include the longitude, latitude, altitude, city, country, state, and the like. Additionally, location information may be determined via methods that incorporate analysis of signal strength of the user device 18 in relation to known locations of cell towers, WiFi devices, and the like.

The data access system 12 may retrieve data access properties for the user with regard to different types of data (block 96). In one embodiment, the data access system may differentiate access rights based on whether the user is accessing confidential or non-confidential data. In certain embodiments, the data access system 12 may enforce stricter access rights, such as a decreased time allotment, limited actions that the user may take, decreased thresholds, and the like, when the user is accessing confidential data. Similarly, the data access properties in regard to time periods may be retrieved by the data access system 12 (block 98). In one embodiment, the data access properties may contain information as to the usual times that the user may access data. For example, the data may contain information that shows that a user usually accesses data at an hour X for a set amount of time Y at certain days of the week. In accordance with the embodiments described above, the data access properties in regards to different types of data, time periods, and the like may be retrieved from or stored in the database 16 or any other suitable storage device.

At block 100, the data access system 12 may retrieve user access rights data. The user access rights may pertain to the user's allocated time period to access the data, the type of data the user may access, the user's modification rights (such as if a user may modify, add, delete, or perform similar actions to the data), and the like. In certain embodiments, the user's access rights may be previously modified by the machine learning algorithm, the owner of the system, or the like. Such user access rights may be retrieved from or stored in the database 16 or any other suitable storage device.

The data access system 12 may account for the number of attempts to access each type of data to generate the model, as shown in block 102. In one embodiment, the data access system 12 may retrieve data detailing a number of attempts that a user or multiple users attempt to access confidential data. The data access system 12 may store or retrieve the data concerning the number of access attempts from the database 16 or any other suitable storage device. The data access system 12 may have a dynamic timeframe in which the user may attempt to access the data. This dynamic timeframe may be modified based on the number of attempts during the time period, a previously set risk tolerance level, and the like.

While generating the model, at block 104, the data access system 12 may retrieve user activity data related to peripheral components or software with respect to data access properties. Such peripheral components may include, but not be limited to, one or more mice, keyboards, touchscreens, electronic pens, storage devices, projectors, cameras, and the like. The data access system 12 may record activities such as, but not limited to, the movement of the mouse, the typing of the keyboard, the inputs from the touchscreen via a pen, finger, or any other similar instrument, and other similar user activities with the accessed data. The data access system 12 may store or retrieve data from the database 16 or any other suitable storage device.

At block 106, the data access system 12 may retrieve user network traffic data associated with data access. Such data may include, but not be limited to, network packets, Wi-Fi information, device data, and the like. In certain embodiments, the data may contain the public IP, hostname, MAC address, and other identification information associated with network traffic. In some embodiments, the data access system 12 may identify and record devices, interfaces, applications, and the like associated with network traffic. For example, in certain embodiments, the data access system 12 may identify if the user is using a VPN service, a TOR browser, or any other suitable interface designed to mask network activity to access the recorded data. The data access system 12 may store or retrieve the network traffic data from the database 16 or any other suitable storage device.

With some or all of the retrieved data, the data access system 12 may generate a model for the purpose of detecting unauthorized user activity (block 108). A machine learning algorithm using the retrieved data may be utilized to generate the model. The data access system 12 may use this model to actively monitor user activity and detect unauthorized user activity. In certain embodiments, the model may utilize previously set thresholds to detect unauthorized activity. Such thresholds may include, but not be limited to: a certain radial distance away from where the user usually accesses data from their device, a set time tolerance as discussed above, a set user-associated limit for accessing certain types of data, and thresholds related to peripheral activities. Expanding on peripheral thresholds, certain embodiments may have the machine learning algorithm set thresholds based on how the user interacts with their peripherals, such as thresholds of mouse movement, keyboard activity, touchscreen activity, and the like.

In accordance with the embodiments described above, the generated model may use a combination of all or some of the data received to detect unauthorized user activity. One example of the model using multiple factors to detect unauthorized activity could be the following: a particular user device 18 (e.g., a desktop with Windows OS®) may be used to access confidential data by a user in the afternoon of a particular city such as Washington D.C. If there is any deviation from the expected activity of the user in any of these factors, such as data accessed in the morning, via a phone, a different operating system, or a different city (or different location within the city), then an unauthorized activity may be flagged. As discussed above, the thresholds may be utilized by the data access system 12 to aid in flagging unauthorized activity. Such a case would be if data is accessed from an unexpected location at an unexpected time, but all other factors are determined to be in line with the user's expected activity. In this case, the data access system 12 may determine to forego flagging the activity as unauthorized if the location and time are within the previously set thresholds as determined earlier by the machine learning algorithm.

Additionally, factors may be associated with each other to model the expected user activity. For example, a user may prefer to use a desktop computer to access data at night time at the location of their home, while on the other hand the user may use their phone to access data at various times of day at various times of the city. The machine learning algorithm will be able to differentiate these associated factors and continuously improve as the user continues to use the data access system 12. The more the user, or plurality of users, uses the data access system 12, the greater and more complex the generated model can be in detailing the authorized user activity.

By performing the embodiments described herein, security capabilities for protecting data will be greatly enhanced, with improved network efficiency as an added bonus. Hackers and other similar bad actors that would like to access data protected by this system will not only have to overcome the usual data protections (e.g. passwords, PINS, etc.), but also will have to overcome the novel ways of detecting authorized users as supported by the machine learning aspects of this system. For example, a hacker may secure the authorization (e.g. a password associated with an authorized user) needed to access the data via a method such as social engineering, but even in this case the bad actor will still not be able to access the data. The data access system 12, using its generated model, will be able to actively detect that the user is not the associated authorized user and will prevent further access to the data. With this system, unauthorized users will have to not only gain user access authorization, they will have to emulate to a high degree the subtle activities and actions that the proper authorized user would do under normal circumstances.

Another benefit of this system is improved network efficiency. As discussed above and shown in detail in FIG. 5, the data access system 12 may more efficiently identify unauthorized data access attempts by comparing access attempts to a collection of behavior characteristics, as opposed to systematically reviewing each behavior characteristic individually. Less usage of resources such as memory and processor resources will ensure that data access system 12 works as efficiently as possible; both increasing security capabilities and possibly lowering operational costs.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
receiving, via a processor, a request to access data stored in a storage component;
determining, via the processor, an identity of a user requesting access to the data based on user device data;
monitoring, via the processor, a plurality of activities performed by the user on the data;
determining, via the processor, whether the plurality of activities correspond to a plurality of expected activities for the user accessing the data based on a model, wherein the model is associated with the identity and is determined based on one or more patterns detected from a plurality of previous accesses to the data by the user, wherein the one or more patterns correspond to the plurality of expected activities comprising a type of computing device employed to access the data, an amount of the data accessed, one or more times at which the data is accessed, and one or more types of user actions performed with the data, wherein the one or more types of user actions comprise capturing the data, changing the data, deleting the data, or any combination thereof;
modifying, via the processor, one or more access rights of the user to the data in response to determining that the plurality of activities do not correspond to the plurality of expected activities, wherein the one or more access rights are modified to decrease an allocated time period corresponding to the user, wherein the allocated time period corresponds to an amount of time during a day in which the user is allowed to access the data;

in response to determining that the plurality of activities do not correspond to the plurality of expected activities:
  sending, via the processor, pseudo data to a user device associated with the user; and
  generating, via the processor, an additional model based on the one or more patterns, wherein the additional model is configured to identify unauthorized access to the data.

2. The method of claim 1, wherein the model is determined by training a machine learning algorithm over a period of time based on a plurality of logs of user activity associated with the user, wherein the plurality of logs comprise information related to the plurality of previous accesses to the data.

3. The method of claim 2, wherein the model is continuously updated based on one or more patterns of behaviors determined based on an additional plurality of logs detected over an additional period of time.

4. The method of claim 1, comprising receiving an additional request for an extension of the allocated time period after expiration of the allocated time period.

5. The method of claim 1, wherein the one or more access rights are further modified by limiting a data type that is allowed to be accessed during the allocated time period.

6. A non-transitory computer readable medium comprising computer-executable instructions that, when executed by at least one processor, are configured to cause the at least one processor to perform operations comprising:
  receiving a request to access data stored in a storage component;
  determining an identity of a user requesting access to the data based on user device data;
  monitoring a plurality of activities performed by the user on the data;
  determining whether the plurality of activities correspond to a plurality of expected activities for the user accessing the data based on a model, wherein the model is associated with the identity and is determined based on one or more patterns detected from a plurality of previous accesses to the data by the user, wherein the one or more patterns correspond to the plurality of expected activities comprising a type of computing device employed to access the data, an amount of the data accessed, one or more times at which the data is accessed, and one or more types of user actions performed with the data, wherein the one or more types of user actions comprise capturing the data, changing the data, deleting the data, or any combination thereof;
  modifying one or more access rights of the user to the data in response to determining that the plurality of activities do not correspond to the plurality of expected activities, wherein the one or more access rights are modified to decrease an allocated time period corresponding to the user, wherein the allocated time period corresponds to an amount of time during a day in which the user is allowed to access the data;
  in response to determining that the plurality of activities do not correspond to the plurality of expected activities:
    sending pseudo data to a user device associated with the user; and
    generating an additional model based on the one or more patterns, wherein the additional model is configured to identify unauthorized access to the data.

7. The non-transitory computer readable medium of claim 6, wherein the model is generated based on location data associated with the user, one or more data access properties associated with one or more access sessions of the user, one or more time periods that corresponds to the plurality of activities, one or more user rights associated with the plurality of activities, a number of attempts to perform the plurality of activities, network traffic data associated with the plurality of activities, or any combination thereof.

8. The non-transitory computer readable medium of claim 7, wherein the one or more user rights correspond to one or more allocated time periods specified for performing the plurality of activities, one or more types of data that the user is authorized to access, one or more types of activities that the user is authorized to perform, or any combination thereof.

9. The non-transitory computer readable medium of claim 7, wherein the network traffic data comprise identification information associated with network traffic, mask network information, or both.

10. The non-transitory computer readable medium of claim 7, wherein the plurality of activities is associated with one or more operations performed using one or more peripheral components.

11. The non-transitory computer readable medium of claim 10, wherein the one or more operations comprise a movement of a mouse device, typing on a keyboard device, one or more inputs received via a touchscreen device, or any combination thereof.

12. A system, comprising:
  a computing device; and
  a server system comprising a storage component, wherein the server system is configured to:
  receive a request to access data stored in the storage component from the computing device;
  determine an identity of a user requesting access to the data based on user device data;
  monitor a plurality of activities performed by the user on the data;
  determine whether the plurality of activities correspond to a plurality of expected activities for the user accessing the data based on a model, wherein the model is associated with the identity and is determined based on one or more patterns detected from a plurality of previous accesses to the data by the user, wherein the one or more patterns correspond to the plurality of expected activities comprising a type of computing device employed to access the data, an amount of the data accessed, one or more times at which the data is accessed, and one or more types of user actions performed with the data, wherein the one or more types of user actions comprise capturing the data, changing the data, deleting the data, or any combination thereof;
  modify one or more access rights of the user to the data in response to determining that the plurality of activities do not correspond to the plurality of expected activities, wherein the one or more access rights are modified to decrease an allocated time period corresponding to the user, wherein the allocated time period corresponds to an amount of time during a day in which the user is allowed to access the data;
  in response to determining that the plurality of activities do not correspond to the plurality of expected activities:
    send pseudo data to a user device associated with the user; and generate an additional model based on the one or more patterns, wherein the additional model is configured to identify unauthorized access to the data.

13. The system of claim 12, wherein the server system is configured to send a request to the computing device after modifying the one or more access rights, wherein the request is configured to cause the computing device to receive an input to authenticate the user.

14. The system of claim 13, wherein the input comprises a decryption key, a password, a personal identification number (PIN), biometric authentication, a username, or any combination thereof.

15. The system of claim 12, wherein the model is generated based on location data associated with the user, one or more data access properties associated with one or more access sessions of the user, one or more time periods that corresponds to the plurality of activities, one or more user rights associated with the plurality of activities, a number of attempts to perform the plurality of activities, network traffic data associated with the plurality of activities, or any combination thereof.

16. The system of claim 12, wherein the plurality of expected activities corresponds to a time period for accessing the data, network traffic data associated with accessing the data, or any combination thereof.

17. The system of claim 12, wherein the model is determined based on monitoring a plurality of previous accesses to the data by the user via the user device.

18. The system of claim 12, wherein the server system is configured to:
monitor the type of computing device is attempting to access unauthorized data based on a comparison of access attempts to a collection of behavior characteristics; and
modify the one or more access rights based on the comparison.

19. The system of claim 12, wherein the one or more access rights are configured to allow the type of computing device to access the data while the computing device is positioned indoors or while the computing device is positioned outdoors.

20. The system of claim 12, wherein the server system is configured to:
determine that the user has exceeded an allocated amount of requests for data; and
modify the one or more access rights in response to the user exceeding the allocated amount of request for data.

* * * * *